United States Patent [19]
Krigmont et al.

[11] Patent Number: 5,300,270
[45] Date of Patent: Apr. 5, 1994

[54] HOT-SIDE ELECTROSTATIC PRECIPITATOR

[75] Inventors: Henry V. Krigmont, Seal Beach; Felix E. Spokoyny, Costa Mesa, both of Calif.

[73] Assignee: Wahlco Environmental Systems, Inc., Santa Ana, Calif.

[21] Appl. No.: 933,489

[22] Filed: Aug. 20, 1992

[51] Int. Cl.⁵ .......................... B01J 8/00; C01B 21/00; B03C 1/00
[52] U.S. Cl. .................................. 423/239.1; 423/235; 95/58
[58] Field of Search .................... 423/239, 239 A, 235, 423/235 D; 55/5

[56] References Cited
U.S. PATENT DOCUMENTS 4,872,887 10/1989 Altman et al. ............................ 55/5
5,237,939 8/1993 Spokoyny et al. ............. 423/235 X Primary Examiner—Gregory A. Heller
Attorney, Agent, or Firm—Howard E. Sandler; Stephen Donovan

[57] ABSTRACT

A hot-side electrostatic precipitator removes particulate matter from a NOX-containing flue gas stream passing therethrough, the exit flue gas stream having a temperature of no less than about 450F. The precipitator contains a plurality of collecting surfaces arranged in a series of fields. At least some of the collecting surfaces carry a catalyst which promotes a reaction between NOX in the flue gas passing therethrough and a nitrogeneous compound. Preferably, a nitrogeneous compound such as ammonia is electrically charged and injected into the flue gas stream prior to its passing over the collecting surfaces coated with catalyst. The hot-side electrostatic precipitator may have catalyst coated onto fixed surfaces near its exit end.

7 Claims, 3 Drawing Sheets

HOT-SIDE ELECTROSTATIC PRECIPITATOR

BACKGROUND OF THE DISCLOSURE

This invention relates to the cleanup of flue gases produced from power plants, and, more particularly, to removal of both particulate and gaseous pollutants from the flue gas.

In a fossil-fuel power plant, coal or oil is burned to boil water to form steam. The steam drives a turbine and thence an electric generator, producing electricity. Besides heat, the combustion produces gaseous pollutants such as sulfur and nitrogen oxides, and a solid particulate termed fly ash. Environmental protection laws mandate that the amounts of the gaseous and solid pollutants be maintained at acceptably low levels. The present invention deals with reducing and maintaining both the smog-producing nitrogen oxides, known generally as NOx, and the particulate fly ash within acceptable levels.

A number of technologies are currently employed to reduce the amount of NOx and particulates in the flue gas stream before the flue gas is exhausted to the atmosphere. Particulates are removed from the combustion gas by mechanical devices such as cyclones or barrier filters, or by electrostatic precipitators. Electrostatic precipitators may be placed into the hot gas stream either upstream or downstream of the combustion air preheater. The former is known as a hot-side electrostatic precipitator and the latter is termed a cold-side electrostatic precipitator.

NOx may be removed by reacting the NOx with ammonia. This reaction is accomplished either at high temperature, in the gas phase with no catalyst present, or at lower temperature, at the surface of a catalyst. The catalyst is typically coated onto a fixed substrate bed through which the flue gas flows.

While these techniques are effective to some extent, it is always desirable to provide a further reduction in the pollutants within the limits of economic feasibility. The present invention provides such a further reduction.

SUMMARY OF THE INVENTION

The present invention provides an approach for further reducing the NOx content of the flue gas, as compared with prior approaches, while removing particulate as before. The NOx content of the flue gas is further reduced with only minimal capital expenditure, and without adding a new, major piece of equipment to the power plant. Existing hardware is modified to increase NOx reduction.

The present invention is utilized in conjunction with a hot-side electrostatic precipitator of the type operative for removal of particulate matter from a NOX-containing flue gas stream passing therethrough. The electrostatic precipitator contains a plurality of collecting surfaces arranged in a series of fields. The hot-side electrostatic precipitator is usually placed upstream of the combustion air preheater where the flue gas stream has a temperature of no less than about 450F. In accordance with the invention, at least some of the collecting surfaces carry a catalyst which promotes a reaction between NOx in the flue gas passing therethrough and a nitrogeneous compound.

The hot-side electrostatic precipitator has a plurality of particulate collecting plates, usually arranged in fields of plates, upon whose surfaces the particulate is deposited under an electrostatic driving force. The plates of the furthest upstream collecting fields, first encountered by the flue gas stream, are usually rapidly obscured by a heavy particulate load. However, the plates further downstream, and particularly those in the last field or last few fields, are less heavily and rapidly loaded with particulate. It is most advantageous to apply a coating of catalyst to these fields of plates last encountered by the flue gas, as these plate surfaces experience extended periods of contact with the flue gas before that contact is substantially hindered by the thickening layer of accumulated particulate.

Ammonia or other nitrogeneous compound is injected into the flue gas at, or upstream of, the hot-side electrostatic precipitator with catalyst-coated plates. The reaction between NOx in the flue gas and the injected ammonia produces harmless nitrogen gas and water. This reaction can occur at high temperatures of about 1600F. -2000F., upstream of the hot-side electrostatic precipitator without any catalyst present, and is termed "selective non-catalytic reduction" or SNCR. It can also occur at lower temperatures and to a greater extent of completion with the catalyst present, as in the present approach, and is termed "selective catalytic reduction" or SCR. The present process is aided by electrostatically charging the molecules of the injected ammonia or other nitrogeneous compound with an electrical potential such that the molecules are attracted to the precipitator plates. In the preferred approach, the ammonia is charged negatively, and the plates are grounded (as is usually the case) and therefore charged positively relative to the ammonia. The electrical potential difference forces the ammonia to be attracted to the precipitator plate, increasing its effectiveness in reducing the NOx content.

The present invention provides an advance in the art of effective power plant construction. The reduction of NOx in the power plant flue gas is improved without adding any new facilities or enlarging existing facilities. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE PREFERRED EMBODIMENTS

Figure 1:
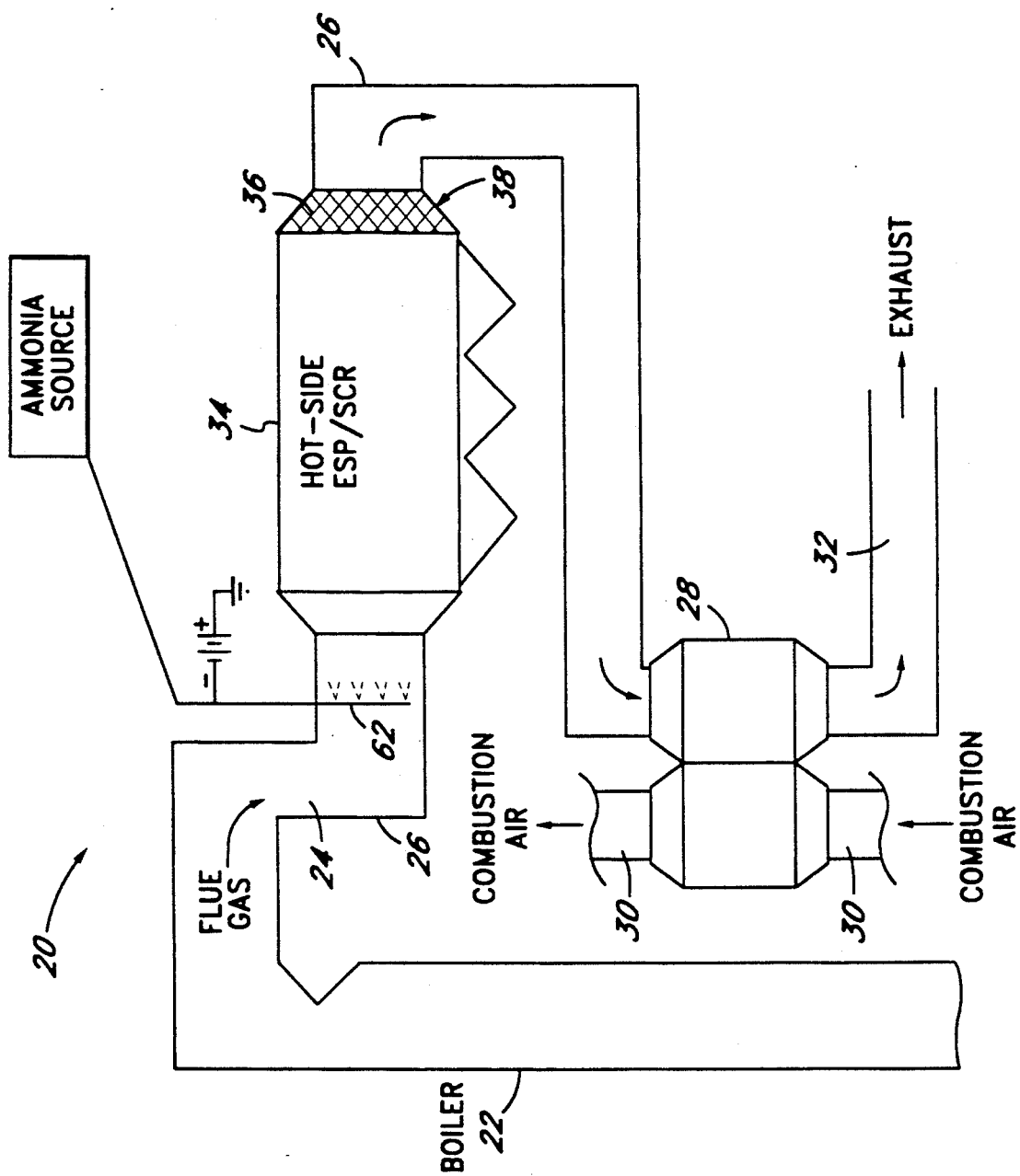
FIG. 1 is a schematic view of a power plant and the hot flue gas conduit.

FIG. 1 schematically depicts the pertinent parts of a power plant 20 of the type well known in the art. Fuel such as oil or coal is mixed with combustion air and burned in a boiler 22, producing a hot flue gas flow 24. The flue gas contains particulate matter and various types of gaseous pollutants. One of these gaseous pollutants, nitrogen oxidized to various oxidation states and termed in the art NOx, is of concern here. NOx emissions lead directly to the production of smog, and levels of NOx emissions are therefore limited by law.

The flue gas passes through a hot-gas conduit 26 and thence to a combustion air preheater 28. The air preheater 28, which may be a regenerative or a recuperative device, transfers heat from the hot flue gas to an intake flow 30 of combustion air, which flows to the boiler 22. Heat is thereby conserved, reducing the self-heating requirements of the boiler. A cooled flue gas stream 32 flows to downstream pollution control equipment and eventually to an exhaust stack.

FIG. 1 also illustrates a hot-side electrostatic precipitator 34, in which solid particulate is removed from the hot gas flow 24. The electrostatic precipitator 34 contains electrodes and collector plates that are electrically charged oppositely. (The structure will be discussed in more detail in relation to FIG. 2.) The solid matter in the flue gas flow 26 is electrically charged and deposits from the flue gas flow onto collection surfaces of the collecting plates for disposal as a solid mass.

Figure 2:
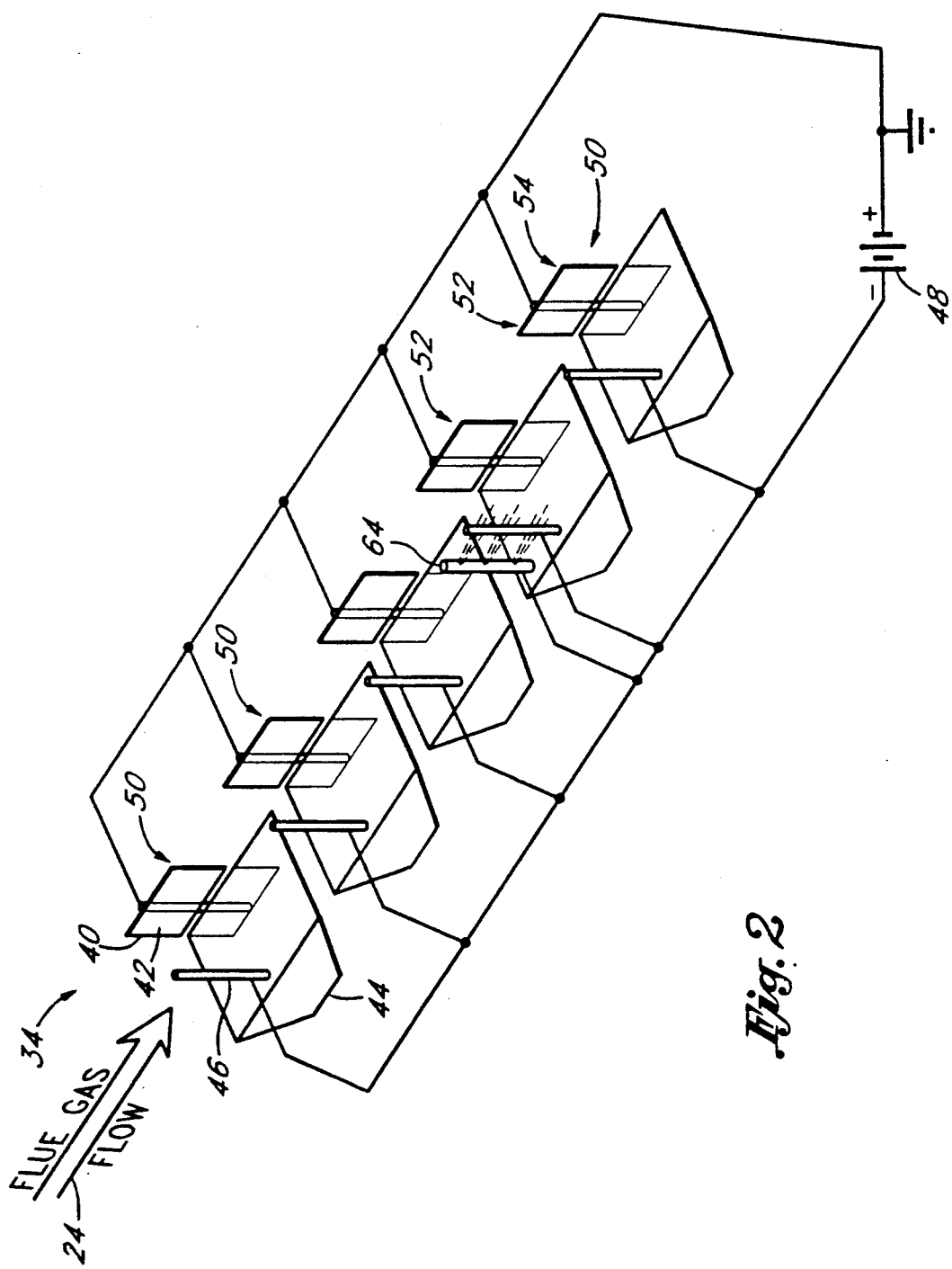
FIG. 2 is a schematic perspective view of the interior of a hot-side electrostatic precipitator.

According to the present invention, additional pollution-control capabilities for hot-side electrostatic precipitation, as well as an improved reaction between the flue gas stream 24 and a catalyst, can be achieved by coating catalyst onto at least some of the collecting surfaces of the hot-side electrostatic precipitator 34. FIG. 2 illustrates the interior of the electrostatic precipitator 34 in greater detail. A plurality of collector plates 40 having collecting surfaces 42 are supported over bins 44. Corona or discharge electrodes 46 are positioned adjacent the collector plates 40 in a facing relationship to their respective collector plates 40.

The discharge electrodes 46 and collector plates 40 have an electrical potential 48 difference applied therebetween. In the usual electrostatic precipitator, the discharge electrodes 46 are charged negatively relative to the grounded collector plates 40 by a voltage difference of about 9,000–10,000 volts per inch of spacing between the discharge electrodes and their respective collector plates, for a total voltage difference on the order of 45,000–60,000 volts in a conventional design. Solid particles in the flue gas stream are charged in the high electric field adjacent to the electrodes 46 and attracted to the collector plates 40. A layer of deposited particles is built up on the collector plates 40 over time. Periodically, the collector plates 40 are struck by an automated rapping mechanism (not shown). The particle deposit falls into the bin 44. The bins are periodically emptied.

The collector plates 40 are usually arranged in fields 50, according to their location within the precipitator, their structure, and their electrical energization. FIG. 2 illustrates five fields 50 of collector plates 40. The catalyst may be coated onto the collector plates 40 of all of the fields. Preferably, however, the catalyst is coated onto only the fields encountered last by the flue gas flow 24, termed the "downstream fields" 52 in the art. In some cases, the catalyst is coated onto only the last field 54 encountered by the flue gas flow 24. In these preferred embodiments, only the collecting surfaces 42 of the downstream fields 52 or the last field 54 are provided with catalyst because the catalyst tends to be quickly covered by the deposited particulate in the earlier fields of collector plates 40. The particulate deposit prevents the flue gas flow from reaching the collecting surfaces, and the particulate deposit accumulates fastest and thickest in the earliest fields. To conserve the catalyst cost, only the downstream or last fields are preferably coated.

Figure 3:
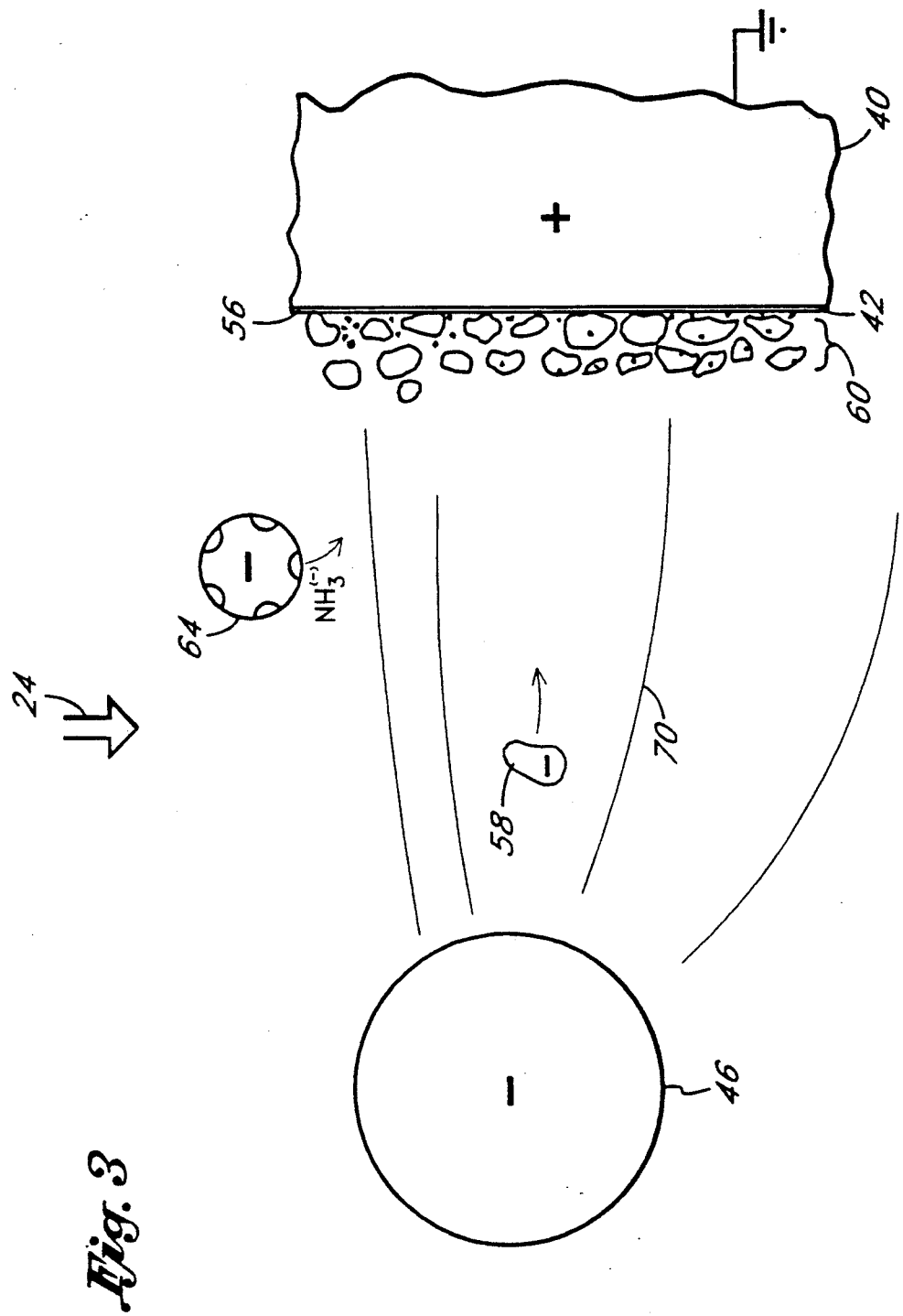
FIG. 3 is a side view of a catalyst-coated collector plate.

FIG. 3 schematically shows a negatively charged discharge electrode 46 and a positively charged collector plate 40 of the electrostatic precipitator 34, with an electric field 70 therebetween. A thin catalyst layer 56 is carried upon the collecting surface 42 of the collector plate 40. For temperatures typical of hot-side electrostatic precipitators, the electrical resistance of the catalyst layer 56 is not significant and does not substantially decrease the collecting efficiency of the hot-side electrostatic precipitator. The catalyst may be any operable catalytic material for the NOx/ammonia reaction, with vanadia, tungsten, zeolite, and noble or transition metals preferred. The catalyst catalyzes a chemical reaction between NOx in the flue gas stream 24 and ammonia that is injected upstream of the collector plates 40, to produce nitrogen and water. The gaseous pollutant NOx is thereby removed from the flue gas stream 24. Deposition of catalyst onto surfaces generally is known in the art. Catalyst-coated products are available commercially from W. R. Grace Company. Fly ash particles 58 are negatively charged by the electric field 70, and are attracted to the collecting surface 42 to form an adhered layer 60. The layer 60 is porous, as the particles 58 are quite loosely agglomerated.

Ammonia is injected into the flue gas flow 24 upstream of the collector plate 40. (The ammonia may be injected as ammonia, or as a nitrogeneous precursor compound such as urea that decomposes at high temperature to form ammonia.) The ammonia may be injected into the flue gas flow 24 prior to its reaching the electrostatic precipitator 34 by an external injector 62 (see FIG. 1). The ammonia may also be injected into the flue gas flow 24 within the electrostatic precipitator 34 by an internal injector 64 (see FIGS. 2 and 3). In either case, the ammonia molecules are preferably electrically charged in such a manner that the ammonia molecules are attracted to the collecting surface 42 of the collector plate 40. In the illustrated embodiment, the injectors are negatively charged, and the negatively charged ammonia is attracted to the grounded collector plates 40.

A fraction of the NOx molecules present in the flue gas flow 24 encounter the collecting surface 42 and the catalyst layer 56. At that location they react with the ammonia molecules to produce nitrogen and water, thereby removing a portion of the NOx from the flue gas flow 24. The reaction products diffuse away with the flue gas flow 24, clearing the collecting surface 42 for further reaction. As the fly ash layer 60 becomes thicker, the diffusion of reactants to the surface 42 and reaction products away from the surface 42 becomes slower, but removal of the layer 60 by periodic rapping restores the reaction rate.

Other surfaces of the hot-side electrostatic precipitator may optionally support a catalyst. In particular, fixed plates 36 of the gas distribution devices present in an outlet section 38 (FIG. 1) of the hot-side electrostatic precipitator 34 may be coated with the same type of catalyst used on the collector plates 40. NOx in the flue gas flow 24 reacts with the added ammonia in the presence of the catalyst on the fixed plates 36 to produce nitrogen gas and water. The fixed plates 36 are normally grounded to the structure of the electrostatic precipitator 34, and therefore the charged ammonia tends to be forced to the fixed plates 36.

Carrying catalyst on the collecting surfaces 42 and the fixed plates 36 of the electrostatic precipitator 34 increases the available reaction surface for catalytic reduction of NOx in the flue gas flow, without adding to the pressure loss within the flue gas flow 24. Since the hot-side electrostatic precipitator 34 is present to remove particulate, increasing its use to catalyzing the NOx reduction reaction does not add to the pressure loss. The capital cost increase for the electrostatic precipitator modified to practice the present invention is minor. The only modifications are that the collecting surfaces are coated with catalyst, and possibly internal ammonia injectors are added. Both external and internal ammonia injectors may be provided with a high-voltage power supply to electrically charge them and thence the injected ammonia.

The approach of the invention yields results that are surprising in light of the state of the art. The reduction of NOx increases with increasing ammonia content at the reaction surface. The present approach permits the injected ammonia to be electrically charged so as to be preferentially attracted to the collecting surfaces 42. The concentration of ammonia at the collecting surfaces relative to the bulk gas flow concentration of ammonia is therefore higher than would otherwise be the case. A lower injection flow rate of ammonia in the present approach therefore yields an equivalent reaction result with a higher injection flow rate of ammonia in conventional processes.

Reduction of the flow rate of ammonia without a loss of effectiveness in NOx reduction is an important benefit of the present approach. Ammonia is classified as a pollutant when it is released to the air. The passage of excess ammonia to the stack, termed "ammonia slip", is an important problem in conventional power plants using only fixed bed catalyst arrangements to reduce the NOx content. In the present case, the existing electrostatic charging capability of the electrostatic precipitator is used to good advantage to reduce the required ammonia injection rate, leading to reduced ammonia slip.

The use of a catalyst on the collector plates of the electrostatic precipitator also has the important advantage that the particulate layer is periodically removed from the collecting surfaces by the existing rapping apparatus. Although they are not used intentionally to gather particulate, other catalyst-coated surfaces do accumulate some amount of particulate deposit. These surfaces are not regularly and automatically cleaned, as is the case for the catalyst-coated surfaces of the electrostatic precipitator. The regular removal of the accumulated particulate restores the efficiency of the catalytic reduction of NOx in the electrostatic precipitator.

The injection of ammonia into the hot-side electrostatic precipitator has the further benefit that it improves space charging and increases the performance of the hot-side electrostatic precipitator. The fixed-bed catalyst in the outlet camera of the hot-side electrostatic precipitator improves the flue gas distribution.

The present approach thus improves the NOx reduction from flue gas such as produced by power plants, without substantial additional capital cost and without adversely affecting gas flow pressures and thence system performance. The approach of the invention may be used in combination with other gas treatment structure, such as selective noncatalytic reduction (SNCR) and selective catalytic reduction (SCR) with a fixed-bed catalyst positioned between the hot-side electrostatic precipitator and the air preheater. Although a particular embodiment of the invention has been described in detail for purposes of illustration, various modifications may be made without departing from the spirit and scope of the invention. Accordingly, the invention is not to be limited except as by the appended claims.

What is claimed is:

1. A process for reducing the NOx in flue gas, comprising the steps of:

furnishing a flow of flue gas containing particulate matter and NOx;

providing an electrostatic precipitator having therein collecting surfaces coated with a catalyst for the reduction of NOx in the flue gas by reaction with a nitrogeneous compound, the electrostatic precipitator being positioned in the flue gas flow at a location such that the temperature of the flue gas is no less than about 450 F. at the point of flue gas exit from the electrostatic precipitator; and operating the electrostatic precipitator to remove particulate from the flue gas, the NOx in the flue gas reacting with the nitrogeneous compound in the presence of the catalyst to reduce the NOx content of the flue gas.

2. The process of claim 1, including the additional step of injecting a nitrogeneous compound into the flue gas at a location upstream of the collecting surfaces coated with a catalyst.

3. The process of claim 2, including the additional step of electrostatically charging the nitrogeneous compound with a charge opposite to that of the collecting surfaces.

4. The process of claim 2, wherein the nitrogeneous compound is ammonia.

5. The process of claim 1, wherein the collecting surfaces are arranged in fields within the electrostatic precipitator.

6. The process of claim 5, wherein the catalyst is carried on the collecting surfaces of a downstream series of fields.

7. The process of claim 5, wherein the catalyst is carried on the collecting surfaces of a last field of the series of fields.

* * * * *